US012603581B2

(12) United States Patent
Okagawa et al.

(10) Patent No.: US 12,603,581 B2
(45) Date of Patent: Apr. 14, 2026

(54) POWER CONVERSION CIRCUIT, AND METHOD FOR PRODUCING POWER CONVERTER

(71) Applicants: Sumitomo Electric Industries, Ltd., Osaka (JP); AutoNetworks Technologies, Ltd., Yokkaichi (JP); Sumitomo Wiring Systems, Ltd., Yokkaichi (JP)

(72) Inventors: Yuusuke Okagawa, Osaka (JP); Tomoaki Ujimaru, Osaka (JP)

(73) Assignees: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

( * ) Notice: Subject to any disclaimer, the term of this patent is extended or adjusted under 35 U.S.C. 154(b) by 303 days.

(21) Appl. No.: 18/273,982

(22) PCT Filed: Feb. 3, 2021

(86) PCT No.: PCT/JP2021/003907
§ 371 (c)(1),
(2) Date: Jul. 25, 2023

(87) PCT Pub. No.: WO2022/168199
PCT Pub. Date: Aug. 11, 2022

(65) Prior Publication Data
US 2024/0429830 A1    Dec. 26, 2024

(51) Int. Cl.
H02M 3/335 (2006.01)
H02M 1/44 (2007.01)
H02M 3/00 (2006.01)

(52) U.S. Cl.
CPC ......... H02M 3/33576 (2013.01); H02M 1/44 (2013.01); H02M 3/01 (2021.05); H02M 3/33573 (2021.05)

(58) Field of Classification Search
CPC .......... H02M 1/44; H02M 3/01; H02M 3/335; H02M 3/33573; H02M 3/33576
See application file for complete search history.

(56) References Cited

U.S. PATENT DOCUMENTS

| | | | | |
|---|---|---|---|---|
| 6,055,162 A | * | 4/2000 | Tarrillo | H02M 3/33576 363/133 |
| 9,570,991 B2 | * | 2/2017 | Akutagawa | H02M 3/33584 |

(Continued)

FOREIGN PATENT DOCUMENTS

| | | |
|---|---|---|
| JP | H05-049248 A | 2/1993 |
| JP | 2003-188022 A | 7/2003 |

(Continued)

*Primary Examiner* — Gary L Laxton
(74) *Attorney, Agent, or Firm* — XSENSUS LLP

(57) ABSTRACT

Provided is a power conversion circuit capable of suppressing noise with fewer components, and a method for producing a power converter. A power conversion circuit (50) includes: a transformer (64) having first and second terminals (100, 102) on a primary side, and third and fourth terminals (104, 106) on a secondary side; a first circuit (60) connected to the first and second terminals; a second circuit (62) connected to the third and fourth terminals; and first and second inductors (66, 68) respectively connected in series to two terminals (100, 106) constituting a combination, the combination being either one of a combination of the first terminal (100) and the third terminal (104) and a combination of the first terminal (100) and the fourth terminal (106), a minimum impedance between the two terminals constituting the combination being higher than that of the other combination.

18 Claims, 7 Drawing Sheets

(56)     References Cited

U.S. PATENT DOCUMENTS

| 2017/0324346 | A1* | 11/2017 | Shin | ........................ | H02M 3/28 |
| 2018/0048240 | A1* | 2/2018 | Hayasaki | .......... | H02M 3/33507 |
| 2020/0106303 | A1* | 4/2020 | Thrimawithana | ........ | H04B 5/79 |
| 2020/0106354 | A1 | 4/2020 | Matsuura | | |
| 2021/0351712 | A1* | 11/2021 | Landseadel | ............. | H02M 1/40 |
| 2022/0321066 | A1* | 10/2022 | Hu | ........................... | H03F 3/26 |

FOREIGN PATENT DOCUMENTS

| JP | 2004-040923 | A | 2/2004 |
| JP | 2020-054134 | A | 4/2020 |

* cited by examiner

POWER CONVERSION CIRCUIT, AND METHOD FOR PRODUCING POWER CONVERTER

CROSS-REFERENCE TO RELATED APPLICATION

The present application is based on PCT/JP2021/003907, filed on Feb. 3, 2021, the entire contents of which are incorporated herein by reference.

TECHNICAL FIELD

The present disclosure relates to a power conversion circuit, and a method for producing a power converter.

BACKGROUND ART

An insulated power conversion circuit using a transformer has been known as a circuit for converting DC power into DC powers having different voltages. In this power conversion circuit, a current that flows on a primary side of the transformer is controlled by controlling switching between on and off states of an FET (Field Effect Transistor) being a switch included in a primary-side circuit, and DC voltages having different voltage values are supplied to a secondary side via the transformer and the secondary-side circuit.

In such a circuit, a path, through which noise caused by switching on the primary side is propagated to the secondary side via a parasitic capacitance between the primary side and the secondary side of the transformer, exists.

A proposal for solving this problem is disclosed in PATENT LITERATURE 1. In the technology disclosed in PATENT LITERATURE 1, a capacitor is added to the secondary side to feed the noise back to the primary side, thereby suppressing the noise. The entire disclosure of PATENT LITERATURE 1 is incorporated herein by reference.

CITATION LIST

Patent Literature

PATENT LITERATURE 1: Japanese Laid-Open Patent Publication No. 2020-054134

SUMMARY OF THE INVENTION

A power conversion circuit according to a first aspect of the present disclosure includes: a transformer having first and second terminals on a primary side, and third and fourth terminals on a secondary side; a first circuit connected to the first and second terminals; a second circuit connected to the third and fourth terminals; and first and second inductors respectively connected in series to two terminals constituting a combination, the combination being either one of a combination of the first terminal and the third terminal and a combination of the first terminal and the fourth terminal, a minimum impedance between the two terminals constituting the combination being higher than that of the other combination.

A power conversion circuit according to a second aspect of the present disclosure includes: a transformer having first and second terminals on a primary side, and third and fourth terminals on a secondary side; a first circuit connected to the third and fourth terminals; a second circuit connected to the third and fourth terminals; and first and second inductors respectively connected in series to two terminals constituting a combination, the combination being either one of a combination of the first terminal and the third terminal and a combination of the first terminal and the fourth terminal, a minimum resonance frequency between the two terminals constituting the combination being lower than that of the other combination.

A method for producing a power converter according to a third aspect of the present disclosure includes: a preparation step of preparing a transformer having first and second terminals on a primary side and third and fourth terminals on a secondary side; a measurement step of measuring a minimum impedance between each of the first terminal and the second terminal and each of the third terminal and the fourth terminal; and a step of connecting inductors in series to two terminals between which the minimum impedance measured in the measurement step is highest.

A method for producing a power converter according to a fourth aspect of the present disclosure includes: a preparation step of preparing a transformer having first and second terminals on a primary side and third and fourth terminals on a secondary side; a measurement step of measuring a minimum resonance frequency between each of the first terminal and the second terminal and each of the third terminal and the fourth terminal; and a step of connecting inductors in series to two terminals between which the minimum resonance frequency measured in the measurement step is lowest.

DETAILED DESCRIPTION

Figures 1A, 1B:
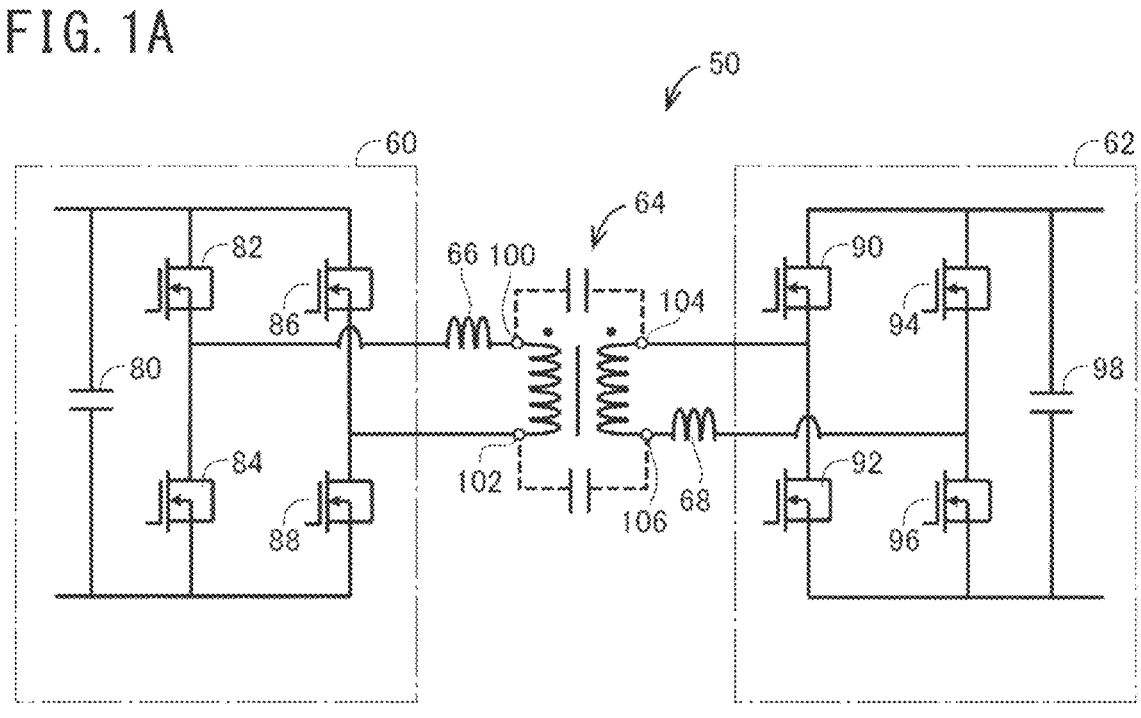
FIG. 1A is a circuit block diagram showing an aspect of a configuration of a conversion circuit according to a first embodiment of the present disclosure.
FIG. 1B is a circuit block diagram showing another aspect of the configuration of the conversion circuit according to the first embodiment of the present disclosure.

Problems to be Solved by the Present Disclosure

In the technology disclosed in PATENT LITERATURE 1, the capacitor is added to the secondary side of the transformer, and the noise is fed back from the secondary side to the primary side. Therefore, an additional component, i.e., the capacitor, is required, and moreover, a wire connecting the primary side to the secondary side for feedback of the noise is also required. This causes an increase in the number of components, and an increase in cost.

Therefore, an object of the present disclosure is to provide a power conversion circuit capable of suppressing noise with fewer components, and a method for producing a power converter.

Effects of the Present Disclosure

According to the present disclosure, it is possible to provide a power conversion circuit capable of suppressing noise with fewer components, and a method for producing a power converter.

The foregoing and other objects, features, aspects, and advantages of the present disclosure will become apparent from the following detailed description of the present disclosure when taken in conjunction with the accompanying drawings.

Description of Embodiment of the Present Disclosure

In the description below and the drawings, the same components are denoted by the same reference signs. Therefore, detailed descriptions thereof are not repeated. At least some parts of the disclosure described below may be combined together as desired.

(1) A power conversion circuit according to a first aspect of the present disclosure includes: a transformer having first and second terminals on a primary side, and third and fourth terminals on a secondary side; a first circuit connected to the first and second terminals; a second circuit connected to the third and fourth terminals; and first and second inductors respectively connected in series to two terminals constituting a combination, the combination being either one of a combination of the first terminal and the third terminal and a combination of the first terminal and the fourth terminal, a minimum impedance between the two terminals constituting the combination being higher than that of the other combination.

According to this configuration, an impedance of a major noise-propagation path in the transformer is increased, thereby efficiently reducing propagation of noise while suppressing an increase in the number of components to be added.

(2) A power conversion circuit according to a second aspect of the present disclosure includes: a transformer having first and second terminals on a primary side, and third and fourth terminals on a secondary side; a first circuit connected to the first and second terminals; a second circuit connected to the third and fourth terminals; and first and second inductors respectively connected in series to two terminals constituting a combination, the combination being either one of a combination of the first terminal and the third terminal and a combination of the first terminal and the fourth terminal, a minimum resonance frequency between the two terminals constituting the combination being lower than that of the other combination.

According to this configuration, an impedance of a major noise-propagation path in the transformer is increased, thereby efficiently reducing propagation of noise while suppressing an increase in the number of components to be added.

(3) The power conversion circuit may further include: a third inductor connected in series to the second terminal; and a fourth inductor connected in series to a terminal, out of the third terminal and the fourth terminal, to which the second inductor is not connected.

According to this configuration, impedances of all noise propagation paths in the transformer are increased, thereby efficiently reducing propagation of noise while suppressing an increase in the number of components to be added.

(4) At least either the first inductor and the third inductor or the second inductor and the fourth inductor are magnetically coupled with each other.

According to this configuration, propagation of noise in the transformer can be efficiently reduced while saving an area where inductors for noise reduction are disposed.

(5) An inductor may not necessarily be connected to any one of the second terminal and a terminal, out of the third terminal and the fourth terminal, to which the second inductor is not connected.

According to this configuration, propagation of noise through the major noise-propagation path in the transformer can be efficiently reduced while suppressing an increase in the number of components to be added.

(6) The first circuit may include a full bridge circuit.

In the full bridge circuit, noise is caused by switching. It is possible to efficiently prevent this noise from propagating to the secondary-side circuit through the transformer.

(7) The second circuit may include a full bridge circuit.

When the secondary-side circuit is the full bridge circuit, propagation of noise from the primary side causes a loss in an output voltage. Such a power loss can be reduced by efficiently preventing noise while suppressing an increase in the number of components to be added.

(8) The transformer may have a first coil and a second coil on the secondary side, the third terminal and the fourth terminal may be connection terminals to the first coil, and the power conversion circuit may further include a third circuit connected to the second coil.

Even when the third circuit, which is a second circuit on the secondary side, is connected to the secondary side of the transformer, propagation of noise between the first circuit and the second circuit can be efficiently reduced while suppressing an increase in the number of components to be added.

(9) The transformer may have fifth and sixth terminals as terminals of the second coil, and the power conversion circuit may include third and fourth inductors respectively connected in series to two terminals constituting a combination. The combination is one of a combination of the first terminal and the fifth terminal and a combination of the first terminal and the sixth terminal, and is one of a combination having a minimum impedance between the two terminals higher than that of the other combination and a combination having a minimum resonance frequency between the two terminals lower than that of the other combination.

As for the third circuit, propagation of noise from the first circuit can be reduced. Additional components required for this purpose are two inductors, and these inductors may be assumed to be used for a purpose other than noise reduction. In such a case, propagation of noise to the third circuit can be reduced without additional components. Even when inductors are not originally used, propagation of noise to the third circuit can be efficiently reduced by appropriately disposing two inductors.

(10) A method for producing a power converter according to a third aspect of the present disclosure includes: a preparation step of preparing a transformer having first and second terminals on a primary side and third and fourth terminals on a secondary side; a measurement step of measuring a minimum impedance between each of the first terminal and the second terminal and each of the third terminal and the fourth terminal; and a step of connecting inductors in series to two terminals between which the minimum impedance measured in the measurement step is highest.

The power converter produced according to the above procedure can effectively reduce propagation of noise from the primary-side circuit to the secondary-side circuit of the transformer.

(11) A method for producing a power converter according to a fourth aspect of the present disclosure includes: a preparation step of preparing a transformer having first and second terminals on a primary side and third and fourth terminals on a secondary side; a measurement step of measuring a minimum resonance frequency between each of the first terminal and the second terminal and each of the third terminal and the fourth terminal; and a step of connecting inductors in series to two terminals between which the minimum resonance frequency measured in the measurement step is lowest.

The power converter produced according to the above procedure can effectively reduce propagation of noise from the primary-side circuit to the secondary-side circuit of the transformer.

DETAILS OF EMBODIMENT OF THE PRESENT DISCLOSURE

Hereinafter, specific examples of a power conversion circuit and a method for producing a power converter according to embodiments of the present disclosure will be described with reference to the drawings. The present disclosure is not limited to these examples and is indicated by the claims, and is intended to include meaning equivalent to the claims and all modifications within the scope of the claims.

First Embodiment

Depending on the circuit system of a power conversion circuit, there is a case where a transformer and a coil are connected in series and inductors are adopted on both a primary side and a secondary side. In this case, which terminals of the transformer should be connected to the inductors can be freely designed. However, when positions where the inductors are disposed are determined, a viewpoint of suppressing noise is not adopted. In the embodiments described below, when inductors are adopted, a noise propagation path from the primary side to the secondary side is considered, thereby reducing noise without increasing the number of components or while suppressing an increase in the number of components.

FIG. 1A and FIG. 1B each show a schematic configuration of a conversion circuit according to a first embodiment of the present disclosure. A conversion circuit 50 shown in FIG. 1A and a conversion circuit 120 shown in FIG. 1B are embodiments of the present disclosure, and have substantially the same configuration. However, the conversion circuits 50 and 120 are different from each other in the positions of inductors inserted between a transformer, and a primary-side circuit and a secondary-side circuit. The reason will be described later.

With reference to FIG. 1A, the conversion circuit 50 includes a transformer 64, a primary-side full bridge circuit 60 connected to a primary side of the transformer 64, and a secondary-side full bridge circuit 62 connected to a secondary side of the transformer 64.

The primary-side full bridge circuit 60 includes: a capacitor 80 connected between a positive electrode and a negative electrode of a DC power supply (not shown); and FETs 82, 84, 86, and 88 which constitute the full bridge circuit and are also connected between the positive electrode and the negative electrode of the DC power supply. A connection node between a source electrode of the FET 82 and a drain electrode of the FET 84 is connected to a first terminal 100 of the transformer 64 via an inductor 66. A connection node between a source electrode of the FET 86 and a drain electrode of the FET 88 is connected to a second terminal 102 of the transformer 64.

The secondary-side full bridge circuit 62 includes: a capacitor 98 connected between two terminals of a load (not shown); and FETs 90, 92, 94, and 96 which constitute a full bridge circuit and are connected to the same load. A connection node between a source electrode of the FET 90 and a drain electrode of the FET 92 is connected to a third terminal 104 of the transformer 64. A connection node between a source electrode of the FET 94 and a drain electrode of the FET 96 is connected to a fourth terminal 106 of the transformer 64 via an inductor 68.

That is, the inductor 66 and the inductor 68 are respectively connected in series to terminals, having opposite polarities, of a primary-side coil and a secondary-side coil of the transformer 64. The reason why these inductors are positioned as described above and the effects thereof will be described later.

Meanwhile, with reference to FIG. 1B, the conversion circuit 120 includes a primary-side full bridge circuit 60, a transformer 64, and a secondary-side full bridge circuit 62, similarly to the conversion circuit 50. A connection node between a source electrode of an FET 82 and a drain electrode of an FET 84 is connected to a first terminal 100 of the transformer 64 via an inductor 66, similarly to the conversion circuit 50. However, in the conversion circuit 120, unlike the conversion circuit 50, a connection node between a source electrode of an FET 94 and a drain electrode of an FET 96 is directly connected to a fourth terminal 106. Meanwhile, a source electrode of an FET 90 and a drain electrode of an FET 92 are connected to a third terminal 104 of the transformer 64 via an inductor 122. That is, the inductor 66 and the inductor 122 are respectively connected in series to terminals, having the same polarity, of a primary-side coil and a secondary-side coil of the transformer 64.

The reason why the connection positions of the inductors differ between the conversion circuit 50 and the conversion circuit 120 is as follows. That is, connection due to a parasitic capacitance exists between the opposite-polarity terminals of the primary-side coil of the transformer 64 and the opposite-polarity terminals of the secondary-side coil of the transformer 64. It is well known that such a parasitic capacitance exists in a transformer.

In the case of the conversion circuit 50 shown in FIG. 1A, connection due to a parasitic capacitance between the first terminal 100 and the third terminal 104 and a parasitic capacitance between the second terminal 102 and the fourth terminal 106 is dominant, and is greater than connection due to a parasitic capacitance between the first terminal 100 and the fourth terminal 106 and a parasitic capacitance between the second terminal 102 and the third terminal 104. Therefore, noise is mainly propagated to the secondary side through a path from the first terminal 100 to the third terminal 104 and a path from the second terminal 102 to the fourth terminal 106. Therefore, in the case of the conversion circuit 50, the inductor 66 and the inductor 68 respectively provided to both these paths inhibit the noise on the primary side from being propagated to the secondary side.

Meanwhile, in the case of the conversion circuit 120 shown in FIG. 1B, connection due to a parasitic capacitance between the first terminal 100 and the fourth terminal 106 and a parasitic capacitance between the second terminal 102 and the third terminal 104 is dominant, and is greater than connection due to a parasitic capacitance between the first terminal 100 and the third terminal 104 and a parasitic capacitance between the second terminal 102 and the fourth terminal 106. Therefore, the noise is mainly propagated to the secondary side through a path from the first terminal 100 to the fourth terminal 106 and a path from the second terminal 102 to the third terminal 104. Therefore, in the case of the conversion circuit 120, the inductor 66 and the inductor 122 respectively provided to both these paths inhibit the noise on the primary side from being propagated to the secondary side.

With reference to FIG. 2A to FIG. 2D and FIG. 3A to FIG. 3D, how to determine arrangement of inductors will be described.

Figure 2A:
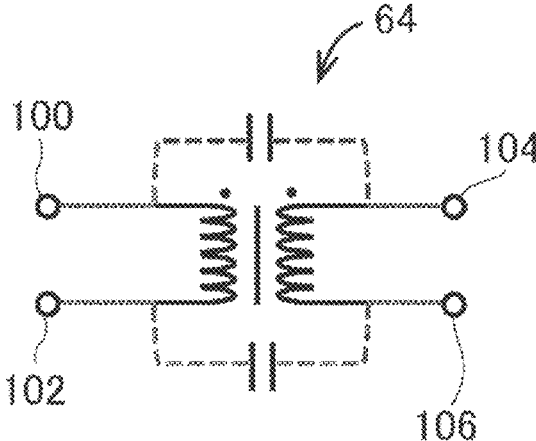
FIG. 2A is a schematic diagram illustrating a procedure of determining inductor insertion positions in the conversion circuit shown in FIG. 1A.
Figure 2B:
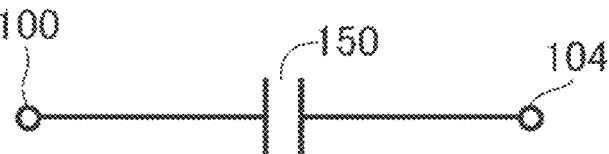
FIG. 2B is a schematic diagram illustrating the procedure of determining inductor insertion positions in the conversion circuit shown in FIG. 1A.
Figure 2C:
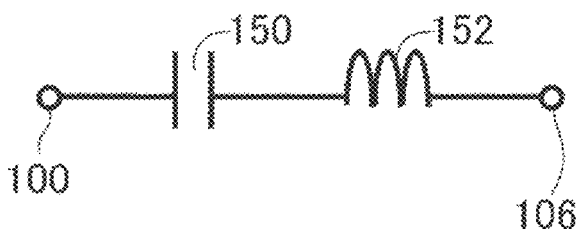
FIG. 2C is a schematic diagram illustrating the procedure of determining inductor insertion positions in the conversion circuit shown in FIG. 1A.

FIG. 2A relates to a case where connection of the path from the first terminal 100 to the third terminal 104 and the path from the second terminal 102 to the fourth terminal 106 is dominant, as in the case of the conversion circuit 50 shown in FIG. 1A. In this case, as shown in FIG. 2B as an equivalent circuit, for example, only a parasitic capacitance 150 exists between the first terminal 100 and the third terminal 104. Meanwhile, as shown in FIG. 2C as an equivalent circuit, a secondary side coil 152 exists in the path between the first terminal 100 and the fourth terminal 106, in addition to the parasitic capacitance 150. Therefore, the path from the first terminal 100 to the fourth terminal 106 behaves as a so-called LC series connection. Therefore, by measuring |Z| characteristics of the two paths and comparing them with respect to the minimum resonance frequency or the minimum impedance, it is possible to determine whether the two paths have the relationship shown in FIG. 2B or the relationship shown in FIG. 2C.

Figure 2D:
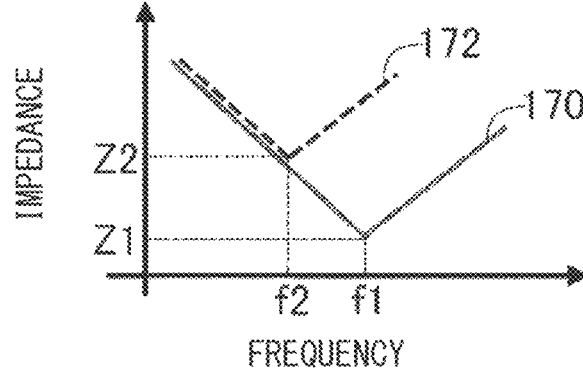
FIG. 2D is a schematic diagram illustrating the procedure of determining inductor insertion positions in the conversion circuit shown in FIG. 1A.

Specifically, in the case of the transformer 64 shown in FIG. 1A, with reference to FIG. 2D, a graph of a |Z| attribute between the terminal 100 and the third terminal 104 becomes an impedance characteristic graph 170, and a graph of a |Z| attribute between the first terminal 100 and the fourth terminal 106 becomes an impedance characteristic graph 172. The minimum resonance frequency and the minimum impedance of the impedance characteristic graph 170 are f1 and Z1, respectively, and the minimum resonance frequency and the minimum impedance of the impedance characteristic graph 172 are f2 and Z2, respectively. Inductors may be provided to the terminals corresponding to the graph having the higher minimum impedance. Here, Z2>Z1 is satisfied, and therefore, the impedance characteristic graph 172 has the higher minimum impedance. Therefore, inductors are provided in series to the first terminal 100 and the fourth terminal 106 corresponding to the impedance characteristic graph 172 (and to the second terminal 102 and the third terminal 104). As seen from FIG. 2D, the lower the minimum resonance frequency is, the higher the minimum impedance is. In this example, f2<f1 is satisfied. Therefore, it is understood that, also when the minimum resonance frequency is used as a reference, inductors may be provided to the first terminal 100 and the fourth terminal 106 corresponding to the impedance characteristic graph 170.

Figure 3A:
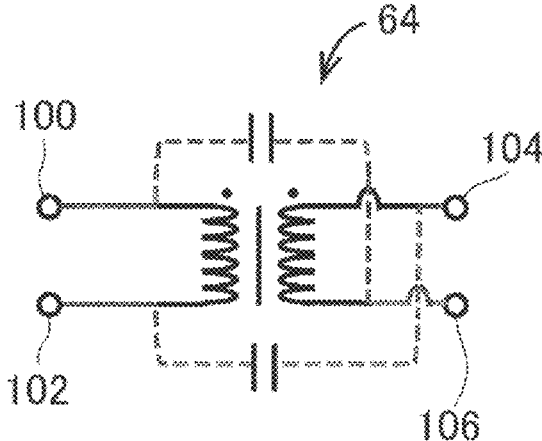
FIG. 3A is a schematic diagram illustrating a procedure of determining inductor insertion positions in the conversion circuit shown in FIG. 1B.
Figure 3B:
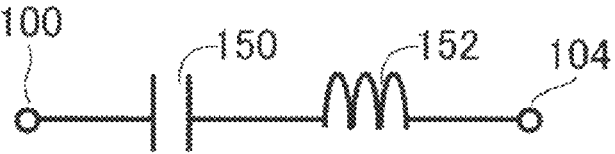
FIG. 3B is a schematic diagram illustrating the procedure of determining inductor insertion positions in the conversion circuit shown in FIG. 1B.
Figure 3C:
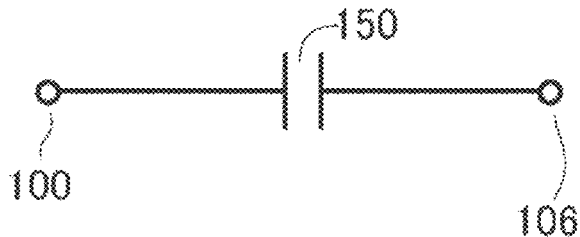
FIG. 3C is a schematic diagram illustrating the procedure of determining inductor insertion positions in the conversion circuit shown in FIG. 1B.

FIG. 3A relates to a case where connection of the path from the first terminal 100 to the fourth terminal 106 and the path from the second terminal 102 to the third terminal 104 is dominant, as in the case of the conversion circuit 120 shown in FIG. 1B. In this case, as shown in FIG. 3B as an equivalent circuit, a parasitic capacitance 150 and a coil 152 exist between the first terminal 100 and the third terminal 104. Meanwhile, as shown in FIG. 3C as an equivalent circuit, only a parasitic capacitance 150 exists in the path between the first terminal 100 and the fourth terminal 106. Therefore, the path from the first terminal 100 to the third terminal 104 behaves as a so-called LC series connection. Therefore, as in the case of the conversion circuit 50, by measuring the |Z| characteristics of the two paths and comparing them with respect to the minimum resonance frequency or the minimum impedance, it is possible to determine whether the two paths have the relationship shown in FIG. 3B or the relationship shown in FIG. 3C.

Figure 3D:
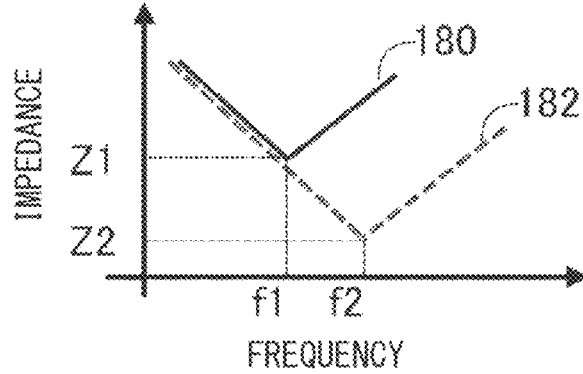
FIG. 3D is a schematic diagram illustrating the procedure of determining inductor insertion positions in the conversion circuit shown in FIG. 1B.

Specifically, in the case of the transformer 64 shown in FIG. 1B, with reference to FIG. 3D, a graph of a |Z| attribute between the first terminal 100 and the third terminal 104 becomes an impedance characteristic graph 180, and a graph of a |Z| attribute between the first terminal 100 and the fourth terminal 106 becomes an impedance characteristic graph 182. A minimum resonance frequency and a minimum impedance of the impedance characteristic graph 180 are f1 and Z1, respectively, and a minimum resonance frequency and a minimum impedance of the impedance characteristic graph 182 are f2 and Z2, respectively. Here, inductors may be provided to the terminals corresponding to the graph having the higher minimum impedance. In this case, Z2<Z1 is satisfied, and therefore, the impedance characteristic graph 180 has the higher minimum impedance. Therefore, inductors are provided in series to the first terminal 100 and the third terminal 104 corresponding to the impedance characteristic graph 180 (and to the second terminal 102 and the fourth terminal 106). As seen from FIG. 3D, the lower the minimum resonance frequency is, the higher the minimum impedance is. In this example, (f2>f1 is satisfied. Therefore, it is understood that, also when the minimum resonance frequency is used as a reference, inductors may be provided in series to the first terminal 100 and the third terminal 104 corresponding to the impedance characteristic graph 180.

As described above, in this embodiment, an inductor is provided in a path through which noise is likely to be propagated. Therefore, it is theoretically predicted that the above configuration reduces noise. Also, a noise reduction effect was confirmed though an experiment. For example, it was confirmed through actual measurement that propagation of noise was reduced when inductors were provided as shown in FIG. 1A although the inductors should be provided as shown in FIG. 1B.

In the above embodiment, the minimum impedance or the minimum resonance frequency between the first terminal 100 as a start point and each of the third terminal 104 and the fourth terminal 106, is measured. However, the present disclosure is not limited to the embodiment. The above process may also be performed between the second terminal 102 as a start point and each of the third terminal 104 and the fourth terminal 106. Moreover, the above process may also be performed between the third terminal 104 or the fourth terminal 106 as a start point and each of the first terminal 100 and the second terminal 102.

In the above embodiment, in FIG. 1A, the inductors are connected only to the first terminal 100 and the fourth terminal 106 while inductors are not connected to the second terminal 102 and the third terminal 104. In FIG. 1B, the inductors are connected only to the first terminal 100 and the third terminal 104 while inductors are not connected to the second terminal 102 and the fourth terminal 106. As a result, when there are dominant noise-propagation paths, one inductor is disposed in each of the paths. Therefore, propagation of noise can be efficiently reduced with less inductors. Furthermore, in the above embodiment, both the primary side and the secondary side are full bridge circuits. However, the present disclosure is not limited to the embodiment. At least one or both of the primary side and the secondary side may be a circuit other than a full bridge circuit as long as propagation of noise from the primary side to the secondary side becomes an issue. For example, a half bridge circuit may be adopted. The same applies to other embodiments described below.

Second Embodiment

Figure 4:
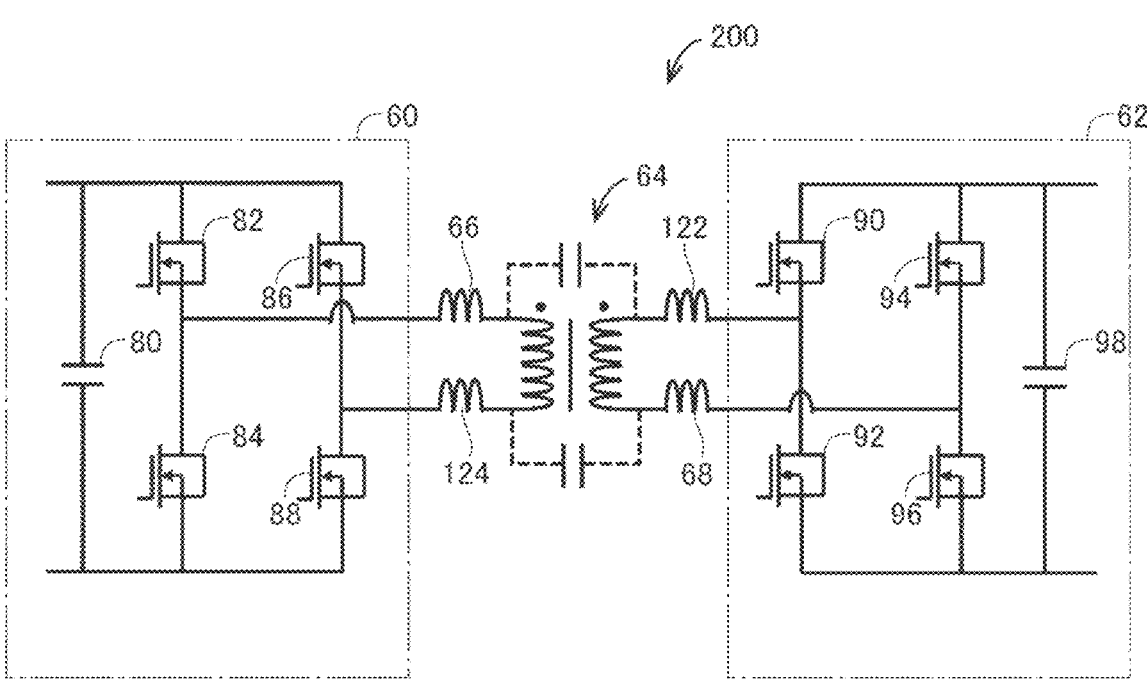
FIG. 4 is a circuit block diagram showing a configuration of a conversion circuit according to a second embodiment of the present disclosure.

In the first embodiment described above, propagation of noise is reduced by using two inductors. However, the present disclosure is not limited to the embodiment. If the use of four inductors is assumed, a configuration shown in FIG. 4 is also conceivable. A conversion circuit 200 shown in FIG. 4 is different from the conversion circuit 50 and the conversion circuit 120 shown in FIGS. 1A and 1B in that an inductor 66 and an inductor 124 are connected between the primary-side full bridge circuit 60 and two primary-side terminals of the transformer 64, and that an inductor 122 and an inductor 68 are respectively connected between the secondary-side full bridge circuit 62 and two secondary-side terminals of the transformer 64. The inductors connected in series to the respective terminals can reduce propagation of noise regardless of the form of dominant capacitive coupling. In actuality, it was confirmed through actual measurement that propagation of noise was more effectively reduced as compared to the first embodiment.

In the above case, as in the first embodiment, a dominant capacitive coupling may be determined from among capacitive couplings of the transformer, and inductors may be disposed so as to increase an impedance of a path corresponding to the dominant capacitive coupling. In this case, if the use of four inductors is assumed, propagation of noise can be effectively reduced without increasing the number of components. Even when the use of four inductors is not assumed, if reduction in noise propagation is a main object, this object can be effectively achieved.

Procedure for Determining Positions of Inductors

Figure 5:
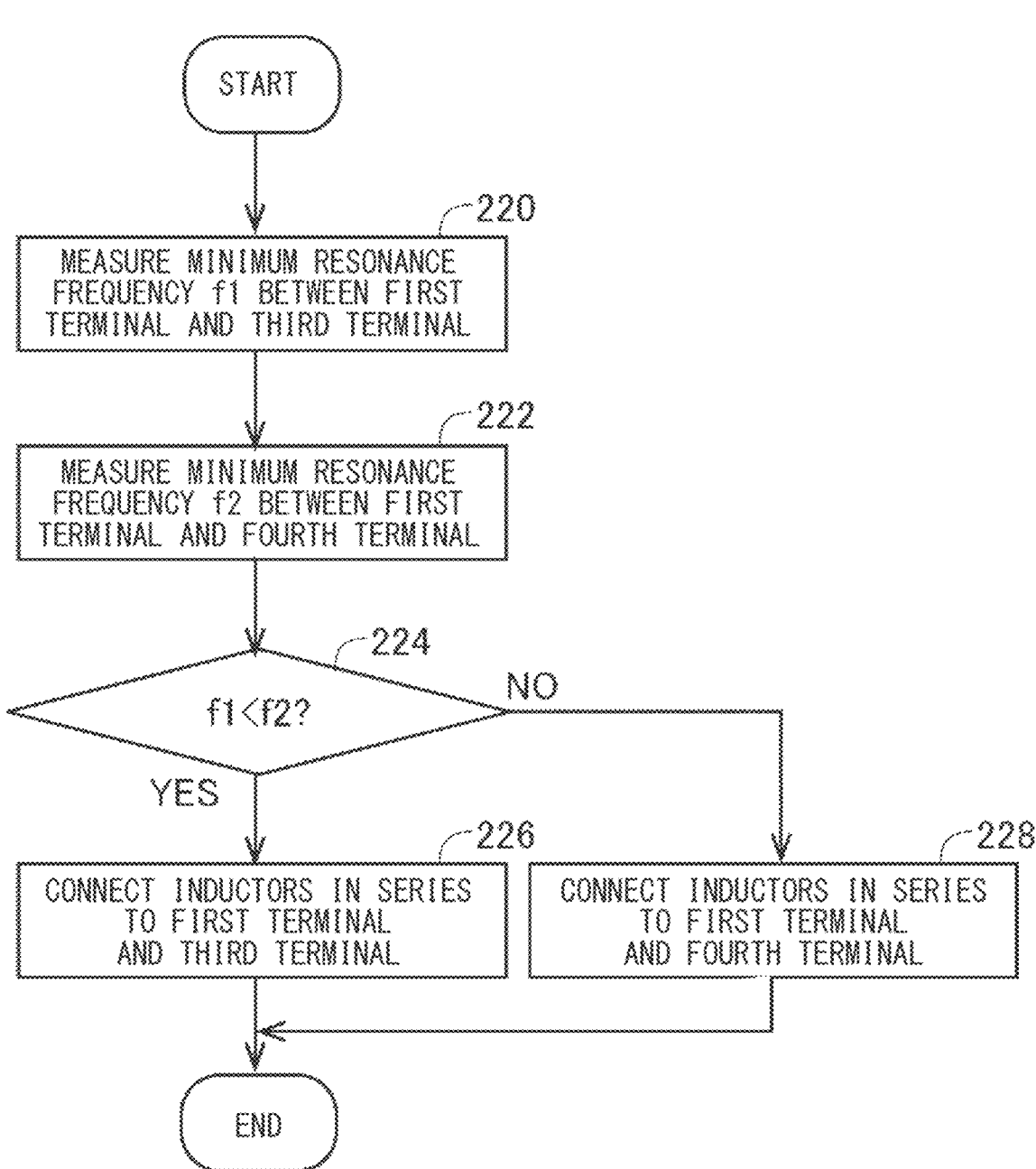
FIG. 5 is a flowchart showing a procedure of determining inductor insertion positions in the first embodiment and the second embodiment of the present disclosure.

FIG. 5 is a flowchart showing a procedure for determining positions of inductors according to a minimum resonance frequency of a |Z| attribute, according to the first embodiment. This procedure includes: step 220 of measuring a |Z| attribute between the first terminal and the third terminal (in FIG. 1A, the first terminal 100 and the third terminal 104) of the transformer to obtain a minimum resonance frequency f1 thereof; step 222 of measuring a |Z| attribute between the first terminal and the fourth terminal (in FIG. 1A, the first terminal 100 and the fourth terminal 106) to obtain a minimum resonance frequency f2; and step 224 of determining whether or not f1<f2 is satisfied, and branching the flow of the procedure according to the determination result.

The procedure further includes: step 226 of, when the determination in step 224 is positive, determining to connect an inductor in series between the first terminal of the transformer and the primary-side circuit, and an inductor in series between the third terminal of the transformer and the secondary-side circuit, to end the design of the transformer and the power conversion circuit: and step 228 of, when the determination in step 224 is negative, determining to connect, in series, an inductor between the first terminal of the transformer and the primary-side circuit, and an inductor between the fourth terminal of the transformer and the secondary-side circuit, to end the design of the transformer and the power conversion circuit.

Figure 6:
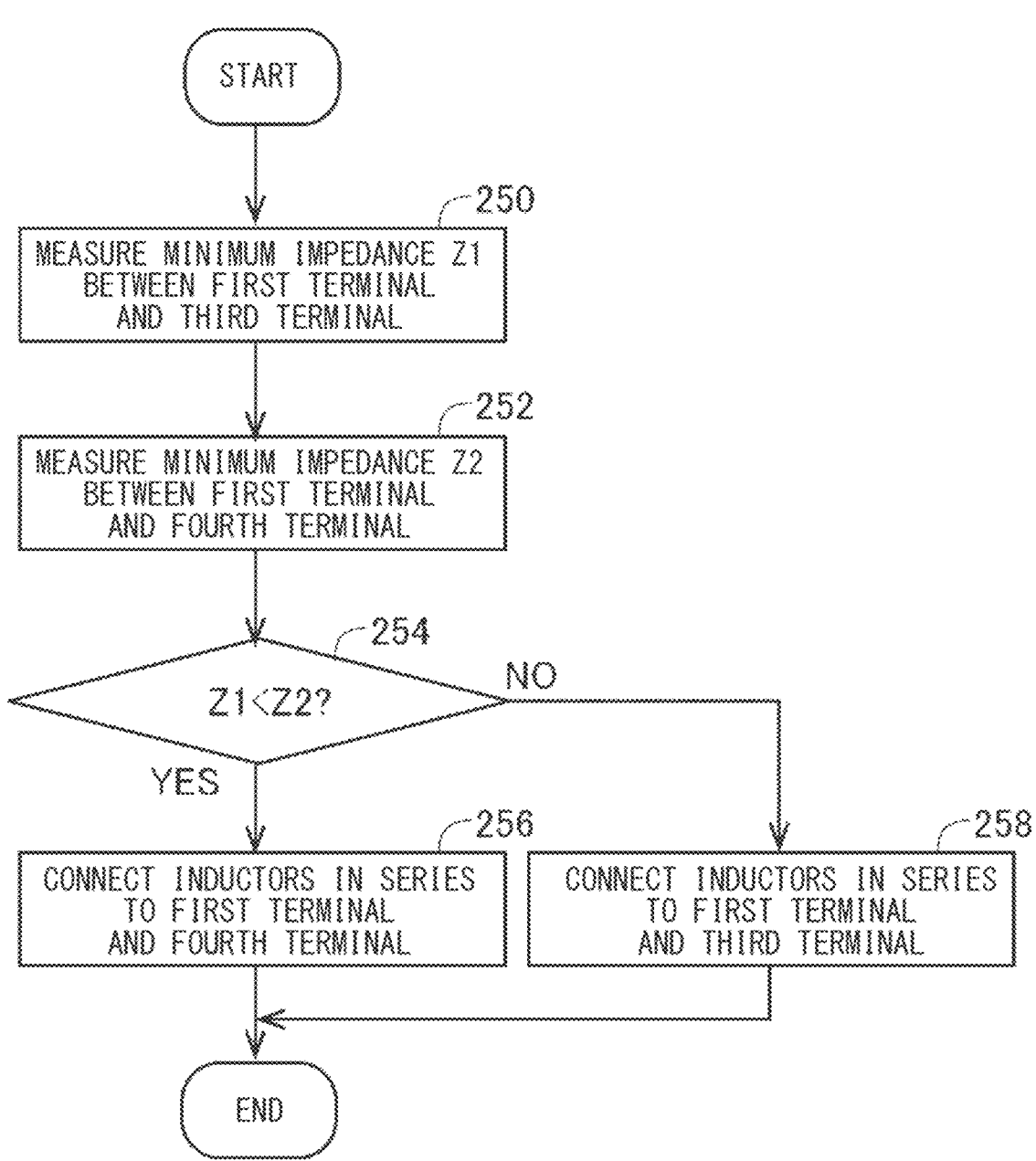
FIG. 6 is a flowchart showing another procedure of determining inductor insertion positions in the first embodiment and the second embodiment of the present disclosure.

FIG. 6 is a flowchart showing a procedure for determining positions of inductors according to a minimum impedance of a |Z| attribute, according to the first embodiment. This procedure includes: step 250 of measuring a |Z| attribute between the first terminal and the third terminal (in FIG. 1A, the first terminal 100 and the third terminal 104) of the transformer to obtain a minimum impedance Z1; step 252 of measuring a |Z| attribute between the first terminal and the fourth terminal (in FIG. 1A, the first terminal 100 and the fourth terminal 106) to obtain a minimum impedance Z2; and step 254 of determining whether or not Z1<Z2 is satisfied, and branching the flow of the procedure according to the determination result.

The procedure further includes: step 256 of, when the determination in step 254 is positive, determining to connect an inductor in series between the first terminal of the transformer and the primary-side circuit, and an inductor in series between the fourth terminal of the transformer and the secondary-side circuit, to end the design of the transformer and the power conversion circuit; and step 258 of, when the determination in step 254 is negative, determining to connect, in series, an inductor between the first terminal of the transformer and the primary-side circuit, and an inductor between the third terminal of the transformer and the secondary-side circuit, to end the design of the transformer and the power conversion circuit.

As described above, according to any of the above procedures, the transformer and the power conversion circuit capable of effectively reducing propagation of noise from the primary side to the secondary side can be obtained as described with respect to the first embodiment.

In the conversion circuit 200 shown in FIG. 4, the inductor 66 and the inductor 124 are independent from each other, and the inductor 122 and the inductor 68 are independent from each other. However, the present disclosure is not limited to the embodiment. For example, the inductor 66 and the inductor 124 may be magnetically coupled (share a core) or the inductor 122 and the inductor 68 may be magnetically coupled. Of course, both the above magnetic couplings may be performed. In this case, an area required for arrangement of inductors for noise reduction can be saved while reducing propagation of noise.

Third Embodiment

In either of the first embodiment and the second embodiment, only one secondary-side circuit (secondary-side full bridge circuit 62) is provided. Therefore, only one secondary-side inductor for noise reduction is provided. However, the present disclosure is not limited to these embodiments. Even when two or more secondary-side circuits are provided, an inductor may be disposed between the second circuit and the transformer to effectively reduce noise.

Figure 7:
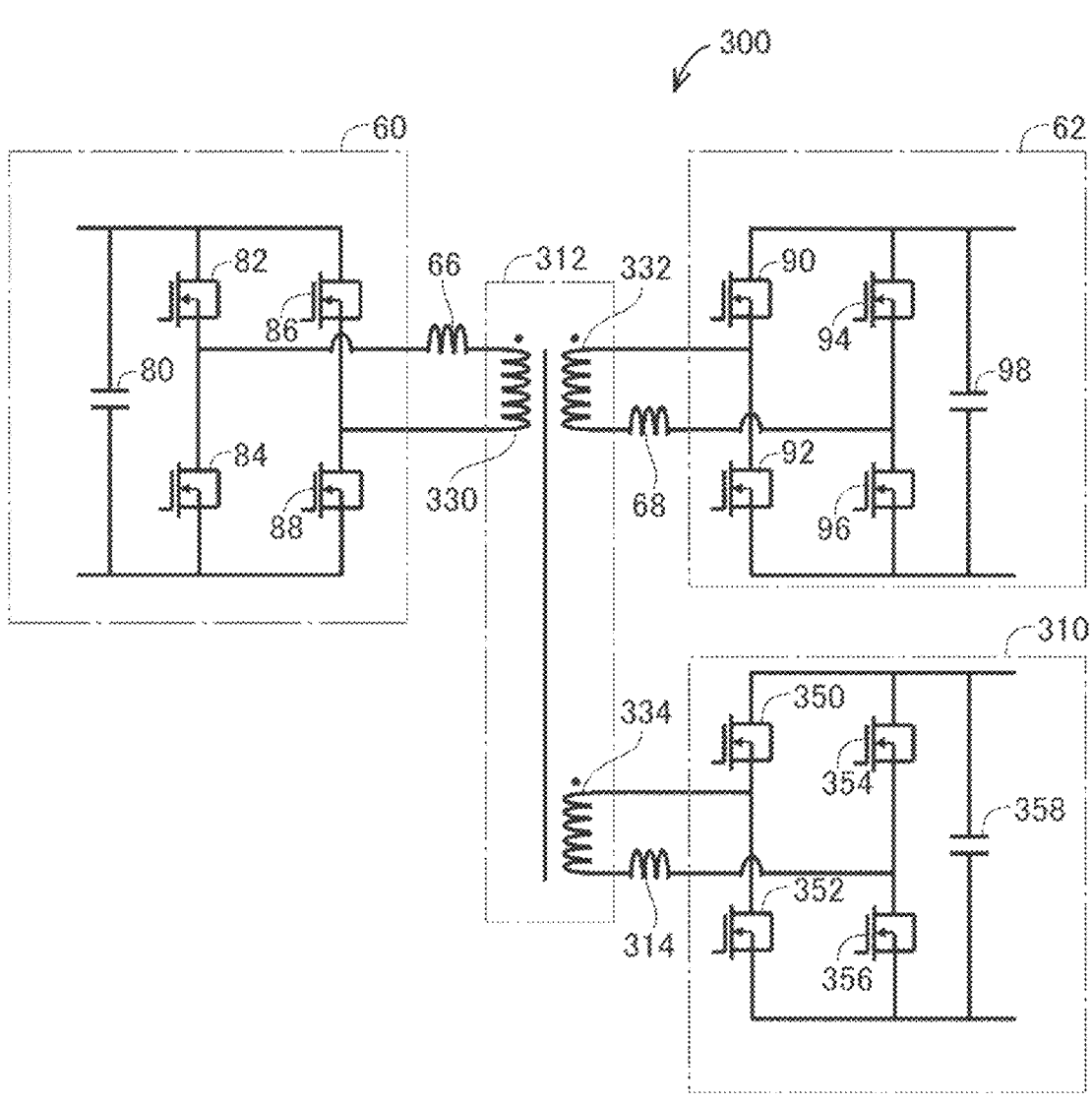
FIG. 7 is a circuit block diagram showing a configuration of a conversion circuit according to a third embodiment of the present disclosure.

With reference to FIG. 7, a conversion circuit 300 according to a third embodiment includes a transformer 312 having a primary-side coil 330 on the primary side, and a secondary-side coil 332 and a secondary-side coil 334 on the secondary side, instead of the transformer 64 shown in FIG. 1B. A primary-side full bridge circuit 60 and a secondary-side full bridge circuit 62 are connected to a first terminal of a transformer 312 and a fourth terminal of the transformer 312 via an inductor 66 and an inductor 68, respectively, as in the case of FIG. 1B. Remaining terminals of the primary-side full bridge circuit 60 and the secondary-side full bridge circuit 62 are connected to a second terminal and a third terminal of the transformer 312 without intervening inductors.

The conversion circuit 300 further includes a second secondary-side coil 334 on the secondary side, and a secondary-side full bridge circuit 310 connected to the secondary-side coil 334. The secondary-side full bridge circuit 310 includes: FETs 350, 352, 354, and 356 constituting the full bridge circuit; and a capacitor 358 that is connected between drain terminals of the FET 350 and the FET 354 and a first terminal of a load (not shown), and source terminals of the FET 352 and the FET 356 and a second terminal of the load.

A connection node between a source terminal of the FET 350 and a drain terminal of the FET 352 is connected to a first terminal of the secondary-side coil 334 (corresponding to a fifth terminal of the transformer 312). A connection node of a source terminal of the FET 354 and a drain terminal of the FET 356 are connected to a second terminal of the secondary-side coil 334 (corresponding to a sixth terminal of the transformer 312) via an inductor 314.

Arrangement of the inductor 66 and the inductor 68 in this case may be determined based on a minimum resonance frequency or a minimum impedance between a terminal, of the primary-side coil 330, connected to the inductor 66 (corresponding to the first terminal 100 in FIG. 1B), and each of two terminals (corresponding to the third terminal 104 and the fourth terminal 106 in FIG. 1B) of the secondary-side coil 332, for example. Likewise, arrangement of the inductor 314 may be determined based on a minimum resonance frequency or a minimum impedance between a terminal, of the primary-side coil 330, connected to the inductor 66, and each of two terminals of the secondary-side coil 334.

According to the above configuration, propagation of noise from the primary-side full bridge circuit 60 to both the secondary-side full bridge circuit 62 and the secondary-side full bridge circuit 310, can be effectively reduced while suppressing an increase in the number of components to be added.

In FIG. 7, the secondary-side full bridge circuit 310 is disposed as a second secondary-side circuit together with the secondary-side full bridge circuit 62. However, the present disclosure is not limited to the embodiment. As a second secondary-side circuit, any circuit that receives power from the primary side via a transformer may be used. For example, a full-wave rectifying circuit may be used as a second secondary-side circuit.

Furthermore, in FIG. 7, an inductor is disposed between the transformer and each of the secondary-side full bridge circuit 62 and the secondary-side full bridge circuit 310. However, the present disclosure is not limited to this embodiment. Only the secondary-side full bridge circuit 62 or the secondary-side full bridge circuit 310 may be connected to the transformer via the inductor.

Other possible configurations according to the above disclosure will be described in the following additional notes.

(Additional note 1) A method for producing a power conversion device is a method for producing a power conversion device including: a transformer having first and second terminals on a primary side, and third and fourth terminals on a secondary side; and a primary-side circuit and a secondary-side circuit respectively connected to the primary side and the secondary side of the transformer. The method includes: a measurement step of measuring a minimum impedance between each of the first and second terminals and each of the third and fourth terminals; and a step of connecting the primary-side circuit and the secondary-side circuit to the transformer such that inductors are connected in series to two terminals between which the minimum impedance measured in the measurement step is highest.

(Additional note 2) A method for producing a power conversion device is a method for producing a power conversion device including: a transformer having first and second terminals on a primary side and third and fourth terminals on a secondary side; and a primary-side circuit and a secondary-side circuit respectively connected to the primary side and the secondary side of the transformer. The method includes: a measurement step of measuring a minimum resonance frequency between each of the first and second terminals and each of the third and fourth terminals; and a step of connecting the primary-side circuit and the secondary-side circuit to the transformer such that inductors are connected in series to two terminals between which the minimum resonance frequency measured in the measurement step is lower.

(Additional note 3) A power converter includes: a transformer including a primary-side coil and a secondary-side coil, the primary-side coil having first and second terminals, the secondary-side coil having third and fourth terminals; and first and second inductors respectively connected in series to two terminals constituting a combination, the combination being either one of a combination of the first terminal and the third terminal and a combination of the first terminal and the fourth terminal, a minimum impedance between the two terminals constituting the combination being higher than that of the other combination.

(Additional note 4) A power converter includes: a transformer including a primary-side coil and a secondary-side coil, the primary-side coil having first and second terminals, the secondary-side coil having third and fourth terminals; and first and second inductors respectively connected in series to two terminals constituting a combination, the combination being either one of a combination of the first terminal and the third terminal and a combination of the first terminal and the fourth terminal, a minimum resonance frequency between the two terminals constituting the combination being lower than that of the other combination.

The embodiments disclosed above are merely illustrative in all aspects and are not restrictive. The technical scope of the present disclosure is not limited to the above-described embodiments, and all changes which come within the range of equivalency of the configurations recited in the claims are therefore intended to be included therein.

REFERENCE SIGNS LIST 50, 120, 200, 300 conversion circuit
60 primary-side full bridge circuit
62, 310 secondary-side full bridge circuit
64, 312 transformer
66, 68, 122, 124, 314 inductor
80, 98, 358 capacitor
82, 84, 86, 88, 90, 92, 94, 96, 350, 352, 354, 356 FET
100 first terminal
102 second terminal
104 third terminal
106 fourth terminal
150 parasitic capacitance
152 coil
170, 172, 180, 182 impedance characteristic graph
220, 222, 224, 226, 228, 250, 252, 254, 256, 258 step
330 primary-side coil
332, 334 secondary-side coil

The invention claimed is:

1. A power conversion circuit, comprising:
a transformer having first and second terminals on a primary side, and third and fourth terminals on a secondary side;
a first circuit connected to the first and second terminals;
a second circuit connected to the third and fourth terminals;
a first inductor connected in series to the first terminal; and
a second inductor connected in series to one of the third terminal and the fourth terminal which provides a highest minimum impedance between the first terminal and the one of the third terminal and the fourth terminal relative to a minimum impedance between the first terminal and another one of the third terminal and the fourth terminal.

2. The power conversion circuit according to claim 1, further comprising:
a third inductor connected in series to the second terminal; and
a fourth inductor connected in series to one of the third terminal and the fourth terminal to which the second inductor is not connected.

3. The power conversion circuit according to claim 2, wherein
the first inductor is magnetically coupled to the third inductor, or
the second inductor is magnetically coupled to the fourth inductor.

4. The power conversion circuit according to claim 1, wherein
no inductor is connected to any one of the second terminal and one of the third terminal and the fourth terminal to which the second inductor is not connected.

5. The power conversion circuit according to claim 1, wherein
the first circuit includes a full bridge circuit.

6. The power conversion circuit according to claim 5, wherein
the second circuit includes another full bridge circuit.

7. The power conversion circuit according to claim 1, wherein
the transformer has a first coil and a second coil on the secondary side,
the third terminal and the fourth terminal are connection terminals to the first coil, and
the power conversion circuit further includes a third circuit connected to the second coil.

8. The power conversion circuit according to claim 7, wherein
the transformer has fifth and sixth terminals as terminals of the second coil, and
the power conversion circuit includes third and fourth inductors,
the third inductor is connected in series with the first terminal, and
the fourth inductor is connected to one of the fifth terminal and the sixth terminal which provides one of a highest minimum impedance or a lowest minimum resonance frequency between the first terminal and the one of the fifth terminal and the sixth terminal relative to a minimum impedance or minimum resonance frequency between the first terminal and another one of the fifth terminal and the sixth terminal.

9. A power conversion circuit, comprising:
a transformer having first and second terminals on a primary side, and third and fourth terminals on a secondary side;
a first circuit connected to the first and second terminals;
a second circuit connected to the third and fourth terminals;
a first inductor connected in series to the first terminal; and
a second inductor connected in series to one of the third terminal and the fourth terminal that results in a lowest minimum resonance frequency between the first terminal and the one of the third terminal and the fourth terminal relative to a minimum resonance frequency between the first terminal and another one of the third terminal and the fourth terminal.

10. The power conversion circuit according to claim 9, wherein
no inductor is connected to any one of the second terminal and one of the third terminal and the fourth terminal to which the second inductor is not connected.

11. The power conversion circuit according to claim 9, wherein
the first circuit includes a full bridge circuit.

12. The power conversion circuit according to claim 11, wherein
the second circuit includes another full bridge circuit.

13. The power conversion circuit according to claim 9, wherein
the transformer has a first coil and a second coil on the secondary side,
the third terminal and the fourth terminal are connection terminals to the first coil, and
the power conversion circuit further includes a third circuit connected to the second coil.

14. The power conversion circuit according to claim 13, wherein
the transformer has fifth and sixth terminals as terminals of the second coil, and the power conversion circuit includes third and fourth inductors, the third inductor is connected in series with the first terminal, and the fourth inductor is connected to one of the fifth terminal and the sixth terminal which provides one of a highest minimum impedance or a lowest minimum resonance frequency between the first terminal and the one of the fifth terminal and the sixth terminal relative to a minimum impedance or minimum resonance frequency between the first terminal and another one of the fifth terminal and the sixth terminal.

15. The power conversion circuit according to claim 9, further comprising:

a third inductor connected in series to the second terminal; and a fourth inductor connected in series to one of the third terminal and the fourth terminal to which the second inductor is not connected.

16. The power conversion circuit according to claim 15, wherein the first inductor is magnetically coupled to the third inductor, or the second inductor is magnetically coupled to the fourth inductor.

17. A method for producing a power converter, comprising:

a preparation step of preparing a transformer having first and second terminals on a primary side and third and fourth terminals on a secondary side;

a measurement step of measuring first minimum impedance between the first terminal and the third terminal, measuring a second minimum impedance between the first terminal and the fourth terminal, measuring a third minimum impedance between the second terminal and the third terminal, and measuring a fourth minimum impedance between the second terminal and the fourth terminal;

a determination step of determining which of the first, second, third, and fourth minimum impedances is highest; and a step of connecting a first inductor in series with the first terminal and a second inductor in series with the third terminal in a case that the first minimum impedance is highest, the first inductor in series with the first terminal and the second inductor in series with the fourth terminal in a case that the second minimum impedance is highest, the first inductor in series with the second terminal and the second impedance in series with the third terminal in a case that the third minimum impedance is highest, and the first inductor in series with the second terminal and the second inductor in series with the fourth terminal in a case that the fourth minimum impedance is highest.

18. A method for producing a power converter, comprising:

a preparation step of preparing a transformer having first and second terminals on a primary side and third and fourth terminals on a secondary side;

a measurement step of measuring a first minimum resonance frequency between the first terminal and the third terminal, measuring a second minimum resonance frequency between the first terminal and the fourth terminal, measuring a third minimum resonance frequency between the second terminal and the third terminal, and measuring a fourth minimum resonance frequency between the second terminal and the fourth terminal;

a determination step of determining which of the first, second, third, and fourth minimum resonance frequencies is lowest; and a step of connecting a first inductor in series with the first terminal and a second inductor in series with the third terminal in a case that the first minimum resonance frequency is lowest, the first inductor in series with the first terminal and the second inductor in series with the fourth terminal in a case that the second minimum resonance frequency is lowest, the first inductor in series with the second terminal and the second impedance in series with the third terminal in a case that the third minimum resonance frequency is lowest, and the first inductor in series with the second terminal and the second inductor in series with the fourth terminal in a case that the fourth minimum resonance frequency is lowest.

* * * * *